United States Patent
Saito et al.

(10) Patent No.: US 9,156,993 B2
(45) Date of Patent: Oct. 13, 2015

(54) PRETREATMENT AGENT FOR INK JET TEXTILE PRINTING, INK JET TEXTILE PRINTING INK SET, AND METHOD OF INK JET TEXTILE PRINTING

(71) Applicant: Seiko Epson Corporation, Tokyo (JP)

(72) Inventors: Toru Saito, Yamagata-mura (JP);
Makoto Furue, Saitama (JP);
Masakazu Ohashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 13/850,449

(22) Filed: Mar. 26, 2013

(65) Prior Publication Data

US 2013/0249996 A1  Sep. 26, 2013

(30) Foreign Application Priority Data

Mar. 26, 2012 (JP) ................. 2012-069208

(51) Int. Cl.
| | |
|---|---|
| *B41J 2/01* | (2006.01) |
| *C09D 1/00* | (2006.01) |
| *B41J 2/21* | (2006.01) |
| *C09D 11/54* | (2014.01) |
| *D06P 5/30* | (2006.01) |
| *D06P 1/44* | (2006.01) |
| *D06P 1/52* | (2006.01) |
| *D06P 1/673* | (2006.01) |
| *C09D 11/102* | (2014.01) |
| *C09D 11/322* | (2014.01) |
| *C09D 11/40* | (2014.01) |
| *B41M 5/00* | (2006.01) |
| *B41M 7/00* | (2006.01) |

(52) U.S. Cl.
CPC ............... *C09D 1/00* (2013.01); *B41J 2/2107* (2013.01); *B41J 2/2114* (2013.01); *B41J 2/2117* (2013.01); *C09D 11/102* (2013.01); *C09D 11/322* (2013.01); *C09D 11/40* (2013.01); *C09D 11/54* (2013.01); *D06P 1/44* (2013.01); *D06P 1/525* (2013.01); *D06P 1/5221* (2013.01); *D06P 1/5285* (2013.01); *D06P 1/6735* (2013.01); *D06P 1/67341* (2013.01); *D06P 1/67375* (2013.01); *D06P 1/67383* (2013.01); *D06P 5/30* (2013.01); *B41M 5/0017* (2013.01); *B41M 7/0018* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; B41M 5/0011; B41M 5/0017; B41M 7/00
USPC ......... 347/100, 95, 96, 101, 102, 103, 88, 99, 347/105, 20, 21; 106/31.6, 31.13, 31.27; 523/160, 161
See application file for complete search history.

(56) References Cited

U.S. PATENT DOCUMENTS

| | | | |
|---|---|---|---|
| 6,774,065 B2 * | 8/2004 | Haruta et al. ............... | 428/194 |
| 2007/0060670 A1 * | 3/2007 | Ellis ............................ | 523/160 |
| 2008/0092309 A1 * | 4/2008 | Ellis et al. .................... | 8/478 |
| 2008/0241397 A1 * | 10/2008 | Kato et al. ................. | 106/31.13 |
| 2008/0268156 A1 * | 10/2008 | Ueno et al. .................. | 427/288 |
| 2010/0071115 A1 * | 3/2010 | Sadato ......................... | 428/196 |
| 2010/0231671 A1 * | 9/2010 | Anton et al. ................. | 347/101 |
| 2011/0102497 A1 * | 5/2011 | Sato et al. .................... | 347/21 |

FOREIGN PATENT DOCUMENTS

| | | |
|---|---|---|
| JP | 60-099081 A | 6/1985 |
| JP | 2008-195767 A | 8/2008 |

* cited by examiner

*Primary Examiner* — Manish S Shah
(74) *Attorney, Agent, or Firm* — Nutter McClennen & Fish LLP; John J. Penny, Jr.; Taylor M. Coon

(57) ABSTRACT

A pretreatment agent was provided for ink jet textile printing. The pretreatment agent contains a polyvalent metal compound, an anionic resin emulsion, a fluorinated water and oil repellent, and water.

14 Claims, No Drawings

US 9,156,993 B2

PRETREATMENT AGENT FOR INK JET TEXTILE PRINTING, INK JET TEXTILE PRINTING INK SET, AND METHOD OF INK JET TEXTILE PRINTING

The entire disclosure of Japanese Application No.: 2012-069208 filed on Mar. 26, 2012 is expressly incorporated by reference herein.

BACKGROUND

1. Technical Field

The present invention relates to a pretreatment agent for ink jet textile printing, an ink jet textile printing ink set including the pretreatment agent, and an ink jet textile printing method using the pretreatment agent.

2. Related Art

Various techniques are applied to recording processes for forming images on paper and other recording media according to image data signals. Among such techniques is an ink jet technique in which images are formed directly on a recording medium by ejecting an ink only onto desired image portions, using an inexpensive apparatus. In the ink jet technique, inks are efficiently used, and accordingly running cost can be reduced. In addition, little noise is produced when the ink jet technique is used, and the ink jet technique is thus advantageous as a recording method.

In recent years, approaches using an ink jet technique have been attempted for forming glossy images having high water fastness and rub fastness, and further high hiding power on the surface of a recording medium by ejecting a white pigment ink onto a recording medium.

For example, in a technique disclosed in JP-A-60-99081 (Example 1), a hard twist textile made of polyester fiber is pretreated by padding of a pretreatment agent (water repellent) of a fluorine-containing compound (Asahi Guard AG-710, manufactured by Asahi Glass) at a drawing rate of 62% and drying at 100° C. for 10 minutes, and a dye ink containing 4 parts of a dispersed dye, 1 part of a sizing agent sodium alginate (viscosity: 40 cps, produced by KIMICA) and 95 parts of ion-exchanged water is splayed to the pretreated hard twist textile by an on-demand ink jet method, thus producing a printed article.

Also, JP-A-2008-195767 (Paragraphs 0056, 0061 and 0069) discloses an aqueous white ink for ink jet textile printing. For preparing the aqueous white ink, 19 parts by mass of water is added to 36 parts by mass of a solution containing a specific polymer dispersant to yield a resin varnish for dispersing titanium oxide, and 45 parts by mass of titanium oxide is added to and mixed with the resin varnish, followed by dispersing the mixture in a wet mill to yield an aqueous white ink base (titanium oxide/dispersant=1/0.2) for ink jet textile printing. Then, to 33.3 parts by mass of the aqueous white ink base are added 33.3 parts by mass of nonionic acrylic resin emulsion (Mowinyl 966A, produced by Nichigo Mowinyl, solid content: 45% by mass) having a glass transition temperature of −30° C., 20 parts by mass of glycerol, 1 part by mass of acetylene glycol ethylene oxide adduct (Acetylenol E 100 produced by Kawaken Fine Chemicals), and 12.4 parts by mass of water. The materials are mixed and stirred to yield the aqueous white ink for ink jet textile printing.

However, when the techniques of the above-cited documents are applied to a white pigment ink, the whiteness of the resulting printed cloth may be very low, and the ink may not be reliably ejected.

SUMMARY

An advantage of some aspects of the invention is that it provides a pretreatment agent that is used for ink jet textile printing and helps produce a printed article having high whiteness.

Another advantage of the invention is that it provides an ink jet textile printing ink set that includes the pretreatment agent and an ink composition and that allows the ink composition to be reliably ejected, and an ink jet textile printing method using the pretreatment agent.

The present inventors have conducted intensive research as below to solve the above issue.

First, the present inventors prepared a pretreatment agent and a white pigment ink in the same manner as in JP-A-60-99081, except that a white pigment was used instead of the dye. The resulting white pigment ink was analyzed in detail. Also, a printed cloth was produced using the pretreatment agent and the white pigment ink, and was analyzed in detail. As a result, it was found that the image of the printed cloth was uneven and that the white pigment of the ink was not aggregated in the image. The inventors investigated the cause of these problems, and found that it is that the pretreatment agent does not contain any resin except a fluororesin. In addition, the inventors investigated why the white pigment does not aggregate and found that it is because the pretreatment agent does not contain any polyvalent metal compound.

The inventors further conducted intensive research and found that a white ink composition containing a polyvalent metal compound and an anionic resin emulsion can solve the problem of the technique disclosed in the above-cited JP-A-60-99081. More specifically, it was found that the polyvalent metal compound in the white ink composition acts to aggregate the white pigment on the surface of the cloth. In addition, it was found that the anionic resin emulsion in the white ink composition acts to prevent unevenness caused in ink jet textile printing.

Furthermore, the inventors analyzed the aqueous white ink base and aqueous white ink for ink jet textile printing disclosed in JP-A-2008-195767 in detail. The inventors further analyzed printed cloth produced using the aqueous white ink base and the aqueous white ink in detail, and found that the resulting printed cloth was inferior in whiteness. More specifically, the whiteness of the image of the printed cloth was very low and insufficient to satisfy the whiteness necessary for printed textile products, such as printed T-shirts. The inventors investigated why the whiteness of the printed cloth was very low and found that it is because the aqueous white ink base acting as a pretreatment agent does not contain a fluorocarbon resin emulsion.

The inventors further conducted intensive research and found that a white ink composition containing a fluorinated water and oil repellent can solve the problem of the technique disclosed in the above-cited JP-A-2008-195767. More specifically, the fluorinated water and oil repellent in the white ink composition acts to reduce at least either the pigment concentration in the white ink composition or the resin concentration in the white ink composition, thereby sufficiently increasing the whiteness of the printed cloth. Furthermore, the inventors found that the presence of the fluorinated water and oil repellent in the pretreatment agent reduces the concentrations of calcium and the anionic resin emulsion, and that this makes it difficult to leave marks formed by pretreatment on the cloth.

It was thus found that a pretreatment agent containing a polyvalent metal compound, an anionic resin emulsion, a fluorinated water and oil repellent and water can solve the above-described problem, and the invention was accomplished.

According to an aspect of the invention, a pretreatment agent for ink jet textile printing having the following features is provided. The pretreatment agent contains a polyvalent metal compound, an anionic resin emulsion, a fluorinated water and oil repellent, and water.

The polyvalent metal compound may be at least either calcium nitrate or calcium chloride.

The content of the metal component of the polyvalent metal compound may be 1% to 5% by mass relative to the total mass of the pretreatment agent.

The anionic resin emulsion content in terms of solid content may be 1% to 5% by mass relative to the total mass of the pretreatment agent, and the fluorinated water and oil repellent content in terms of solid content may be 0.2% to 2% by mass relative to the total mass of the pretreatment agent.

According to another aspect of the invention, an ink jet textile printing ink set is provided which includes the above-described pretreatment agent, and an ink jet textile printing ink composition containing 3% to 11% by mass of a pigment, 5% to 11% by mass of a urethane resin emulsion, and water.

The pigment may be a white pigment, and its content in the ink jet textile printing ink composition is 5% to 11% by mass.

According to another aspect of the invention, an ink jet textile printing method using the above-described ink jet textile printing ink set is provided. In the method, a cloth is pretreated by applying the pretreatment agent to the cloth, and an image is formed by depositing the ink jet textile printing ink composition on the pretreated cloth.

DESCRIPTION OF EXEMPLARY EMBODIMENTS

Embodiments of the invention will now be described in detail. The invention is not limited to the following embodiments, and various modifications may be made within the scope and spirit of the invention.

The term "ink jet textile printing" mentioned herein refers to an ink jet recording method for recording (printing) images or characters on (the surface of) a cloth with an ink and is a technique of ink jet recording. A "recorded article" mentioned herein refers to a thing including a recording medium and an image formed on the medium by recording with an ink. A "printed cloth" mentioned herein is a type of recorded article, and refers to a thing including a cloth as a recording medium and an image formed on (the surface of) the cloth by recording with an ink. "Non-white" mentioned herein refers to a color other than white.

The term "ejection reliability" mentioned herein refers to a property of an ink represented by the number of times of cleaning operation performed until the ink can be ejected again through nozzles after the ink has been ejected through the nozzles and subsequently allowed to stand at 40° C. for one week. The smaller the number of times of cleaning operation, the higher the ejection reliability. The term "pretreatment mark" mentioned can be represented by the color difference ΔE in the CIE/L*a*b* colorimetric system on a cloth between before and after pretreatment of the cloth. The smaller the color difference ΔE, the smaller the pretreatment mark. The term "rub fastness" refers to a property of an image on a cloth representing how difficult to scratch or to separate from the medium or cloth the image is. The term "flexibility" refers to a property of an image on a printed cloth representing that the image is difficult to fracture when the printed cloth is pulled. The term "color developability" refers to a property of an ink printed on a cloth and represents that the ink can have a color with a high color developing efficiency. The term "washing fastness" refers to a property showing the degree of discoloration of a printed cloth, and a high washing fastness implies that the printed cloth is discolored little by washing. The term "long-time stability" refers to a property of an ink depending on the viscosity of the ink and shows how stably the ink can be stored. A high long-time stability implies that the ink exhibits high storage stability. The storage stability mentioned herein refers to a property of an ink represented by the difference in viscosity before and after storing the ink at 60° C. for 7 days. A small difference in viscosity implies that the ink has a high storage stability.

In the description, the term "(meth)acrylate" refers to at least either an acrylate or the corresponding methacrylate, and "(meth)acrylic" compound refers to at least either an acrylic compound or the corresponding methacrylic compound. "(Meth)acryloyl" refers to at least either an acryloyl or a corresponding methacryloyl.

Pretreatment Agent for Ink Jet Textile Printing

A pretreatment agent for ink jet textile printing will now be described according to an embodiment of the invention. The pretreatment agent is used for pretreatment of a cloth performed before ink jet textile printing with an ink. The pretreatment agent contains a polyvalent metal compound, an anionic resin emulsion, a fluorinated water and oil repellent, and water.

The constituents of the pretreatment agent will now be described in detail.

Anionic Resin Emulsion

The pretreatment agent of the present embodiment contains an anionic resin emulsion. The anionic resin emulsion can prevent resin from aggregating effectively, and enhances the fixity of the pretreatment agent to cloth and thus enhances the rub fastness of the resulting printed cloth.

Examples of the resin in the anionic resin emulsion include, but are not limited to, homopolymers and copolymers of (meth)acrylic acid, (meth)acrylic acid ester, acrylonitrile, cyanoacrylate, acrylamide, olefin, styrene, urethane, vinyl acetate, vinyl chloride, vinyl alcohol, vinyl ether, vinyl pyrrolidone, vinyl pyridine, vinyl carbazole, vinyl imidazole and vinylidene chloride, fluororesins, and natural resins.

Preferred examples of the resin include (meth)acrylic resin, styrene-(meth)acrylic resin, (meth)acrylic-urethane resin, and urethane resin. These resins can enhance the rub fastness and washing fastness of the printed cloth, and prevent the occurrence of color unevenness effectively when a white ink is used. More preferably, at least either an acrylic resin or a styrene-acrylic resin is used, and a styrene-acrylic resin is still more preferred. If a copolymer is used, the copolymer may be a random copolymer, a block copolymer, an alternating copolymer, or a graft copolymer.

The anionic resin emulsion may be prepared using known materials by a known method, or may be a commercially available product. Commercially available anionic resin emulsions include, but are not limited to, Mowinyl 952A (Tg=−38° C., solid content: 45% by mass), Mowinyl 710A (Tg=9° C., solid content: 45% by mass), Mowinyl 718A (Tg=−6° C., solid content: 45% by mass), Mowinyl 7320 (Tg=−20° C., solid content: 45% by mass), Mowinyl 7400 (Tg=−41° C., solid content: 50% by mass), Mowinyl 7420 (Tg=−26° C., solid content: 50% by mass) and Mowinyl 966A (Tg=−30° C., solid content: 45% by mass) (each, product of Nippon Synthetic Chemical Industry Co., Ltd.); Microgel E-1002 and Microgel E-5002 (each, product of Nippon Paint Co., Ltd.); VONCOAT 4001 and VONCOAT 5454 (each, product of DIC); SAE 1014 (product of Zeon Corporation); Saivinol SK-200 (product of Saiden Chemical Industry Co., Ltd.); JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780 and JONCRYL 7610 (each, product of BASF); and NK Binder R-5HN (product of Shin-Nakamura Chemical, solid content: 44%). Commercially available urethane resins are the same as in the described below.

Anionic resin emulsions may be used singly or in combination.

The physical properties of the anionic resin emulsion will be described. The texture of the pretreated cloth is affected by the softness of the resin in the anionic resin emulsion. In order to maintain a good texture the cloth originally has, a softer resin is preferably used. The lower the glass transition temperature (Tg), the softer the resin. Preferably, the resin in the anionic resin emulsion has a glass transition temperature of 10° C. or less, more preferably −10° C. or less. By using an anionic resin emulsion containing a resin having such a glass transition temperature Tg, printed cloth can be softer, and the original texture of the cloth can be maintained. The lower limit of the glass transition temperature Tg is not particularly limited, and, for example, can be −40° C. or more.

From the viewpoint of preventing the coating of an ink from fracturing or cracking on cloth, which is an elastic recording medium, so that the resulting printed cloth can exhibit high washing fastness and rub fastness, it is preferable that the resin in the anionic resin emulsion have an elongation at break of 200% to 500% and an elastic modulus of 20 to 400 MPa.

The elongation at break of a resin mentioned herein is the value obtained by measuring an about 60 μm thick film of the resin at a tensile test gauge length of 20 mm and a tension rate of 100 mm/min. The elastic modulus of a resin mentioned herein is the tensile elasticity obtained by measuring a dumbbell test specimen of 10 mm (width of the parallel portion) by 40 mm (length) formed from an about 60 μm thick film of the resin in accordance with JIS K 7161: 1994.

JIS K 7161: 1994 is a standard titled "Plastics-Determination of tensile properties", corresponding to ISO 527-1: 1993, and specifies general principles for measuring tensile properties of plastics and plastic composites under prescribed conditions.

The average particle size D50 of the anionic resin emulsion is preferably 30 to 300 nm, and more preferably 80 to 300 nm. An anionic resin emulsion having a D50 in such a range can be uniformly dispersed in the pretreatment agent. The lower limit of the D50 is preferably 100 nm from the viewpoint of ensuring a still higher rub fastness.

Preferably, the anionic resin emulsion content in terms of solid content is 1% to 5% by mass, more preferably 2% to 4% by mass, relative to the total mass (100% by mass) of the pretreatment agent. By controlling the anionic resin emulsion content in such a range, both of color unevenness and pretreatment marks can be sufficiently prevented when a white ink is printed on a cloth.

Fluorinated Water and Oil Repellent

The pretreatment agent contains a fluorinated water and oil repellent. Preferably, a (meth)acrylate compound having a perfluoro group in a side chain is used as the fluorinated water and oil repellent. The (meth)acrylate compound can be prepared by copolymerizing a perfluoroalkyl (meth)acrylate and a vinyl monomer. For preparing the perfluoroalkyl (meth) acrylate, for example, an intermediate compound, such as a sulfonic acid or alcohol having a perfluoroalkyl group is synthesized by electrochemical fluorination or telomerization, and the intermediate compound is converted into a (meth)acrylate. The vinyl monomer may be, but is not limited to, vinyl chloride, vinyl acetate, acrylonitrile, methyl (meth) acrylate, ethyl (meth)acrylate, stearyl (meth)acrylate, adipic acid, or (meth)acrylamide.

The fluorinated water and oil repellent is cationic. Preferably, the fluorinated water and oil repellent is a weakly cationic compound having a pH of 5.0 to 6.5.

Commercially available fluorinated water and oil repellents include Asahi Guard AG7000, Asahi Guard GS10, Asahi Guard LS-317, Asahi Guard AG970, Asahi Guard AG950, Asahi Guard AG-E060, Asahi Guard AG-E061, Asahi Guard AG-E081, Asahi Guard AG-E082, Asahi Guard AG-E092, Asahi Guard AG-E100, and Asahi Guard AG-E400 (each, product of Asahi Glass); and NK Guard FGN700T and NK Guard NDN7000 (each, product of Nicca Chemical).

Fluorinated water and oil repellents may be used singly or in combination.

Preferably, the fluorinated water and oil repellent content in terms of solid content is 0.2% to 2% by mass, more preferably 0.3% to 1.5% by mass, relative to the total mass (100% by mass) of the pretreatment agent. By controlling the fluorinated water and oil repellent content in such a range, the whiteness of the resulting printed cloth can be satisfactory (a satisfactorily high whiteness can be obtained).

Polyvalent Metal Compound

The pretreatment agent contains a polyvalent metal compound. The polyvalent metal compound can aggregate the pigment particles of the ink composition and precipitate water-dispersed resin (resin emulsion) to form an ink coating on a cloth. More specifically, the polyvalent metal compound reacts with the urethane resin emulsion or polymer-dispersed white pigment dispersion in the ink composition, which will be described later, to aggregate the urethane resin or the pigment on the surface of the cloth, thereby enhancing the whiteness of the image of the printed cloth, making the printed cloth white.

Polyvalent metal compounds include, but are not limited to, titanium compounds, chromium compounds, copper compound, cobalt compounds, strontium compounds, barium compounds, iron compounds, aluminum compounds, calcium compounds, and magnesium compounds. Among these, aluminum compounds, calcium compounds and magnesium compounds are preferred, and dissociative alkaline-earth metal salts, such as calcium salts and magnesium salts, are more preferred. These compounds can aggregate the pigment particles effectively. Still more preferably, at least either a calcium salt or a magnesium salt is used, and further preferably a calcium salt is used. Preferably, the polyvalent metal compound is ionic. In particular, calcium salts enhance the stability of the pretreatment agent, and do not easily precipitate on the surface of the cloth when a pretreated cloth has been subjected to heat press.

Examples of the polyvalent metal compound include inorganic pigments, such as calcium carbonates (ground calcium carbonate and precipitated calcium carbonate), chalk, kaolin, calcinated clay, talc, calcium nitrate, calcium chloride, calcium sulfate, magnesium sulfate, barium sulfate, titanium oxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite, and bentonite; and organic pigments, such as acrylic plastic pigments, polyethylene, and urea polymers. Among these, at least either calcium nitrate or calcium chloride is preferably used, and calcium nitrate is more preferred. These are sufficiently soluble in water and can diminish the appearance of pretreatment marks.

Polyvalent metal compounds may be used singly or in combination.

The content of the metal component of the polyvalent metal compound is preferably 1% to 5% by mass, more preferably 1.5% to 4.5% by mass, relative to the total mass (100%) of the pretreatment agent. When the metal component content is in such a range, the whiteness of the printed cloth can be satisfactory, and the appearance of pretreatment marks can be diminished.

Surfactant

The pretreatment agent may further contain a surfactant. The surfactant is preferably selected from the group consisting of acetylene glycol-based surfactants, acetylene alcohol-based surfactants and polysiloxane-based surfactants. By adding a surfactant to the pretreatment agent, the pretreatment agent can be appropriately dried when it is applied to a cloth.

Polysiloxane-based surfactants are soluble in the pretreatment agent, and are accordingly preferred.

Examples of acetylene glycol-based surfactants and acetylene alcohol-based surfactants include, but are not limited to, 2,4,7,9-tetramethyl-5-decyne-4,7-diol and its alkylene oxide adducts, and 2,4-dimethyl-5-decyne-4-ol and its alkylene oxide adducts. These surfactants are available as commercial products such as Olfine 104 series and Olfine E series such as Olfine E1010 (each, product of Air Products and Chemicals Inc.) and Surfynol 465 and Surfynol 61 (each, product of Nissin Chemical Industry CO., Ltd.).

Exemplary polysiloxane-based surfactants include, but are not limited to, BYK-347 and BYK-348 (each, product of BYK Japan KK).

Surfactants may be used singly or in combination. The surfactant content may be, but not limited to, 0.05% to 0.5% by mass relative to the total mass (100% by mass) of the pretreatment agent.

Sizing Agent

The pretreatment agent may further contain a sizing agent. Examples of the sizing agent include, but are not limited to, starches of corn, wheat and the like, cellulose such as carboxymethyl cellulose and hydroxymethyl cellulose, polysaccharides such as sodium alginate, gum arabic, locust bean gum, trant gum, guar gum and tamarind seeds, protein such as gelatin and casein, water-soluble natural polymers such as tannin and lignin, and water-soluble synthetic polymers such as polyvinyl alcohol compounds, polyethylene oxide compounds, acrylic compounds and maleic anhydride compounds.

Sizing agents may be used singly or in combination. The sizing agent content may be, but is not limited to, 20% by mass or less relative to the total mass (100% by mass) of the pretreatment agent.

Organic Acid

The pretreatment agent may further contain an organic acid. The organic acid can aggregate the pigment particles of the ink composition and precipitate water-dispersed resin (resin emulsion) to form an ink coating on a cloth. The organic acid may be, but is not limited to, acetic acid, propionic acid, or lactic acid.

Organic acids may be used singly or in combination. The organic acid content may be, but is not limited to, 0.01% to 10% by mass relative to the total mass (100% by mass) of the pretreatment agent.

Water

The pretreatment agent is aqueous and contains water as an aqueous solvent. The pretreatment agent may contain a water-soluble organic solvent as an aqueous organic solvent, in addition to water. The water may be, but is not limited to, pure water or ultrapure water, such as ion exchanged water, ultrafiltered water, reverse osmotic water, or distilled water. The water content can be appropriately set without particular limitation. From the viewpoint of appropriately controlling the viscosity of the pretreatment agent, the water content can be 60% to 95% by mass relative to the total mass (100% by mass) of the pretreatment agent.

The pretreatment agent may further contain other additives if necessary, such as a pH adjuster, an antireductant, a metal ion-blocking agent, and an antifoaming agent.

The pretreatment agent enhances the whiteness of the printed cloth and allows the use of an ink having good ejection reliability. Also, the pretreatment agent does not leave pretreatment marks on the cloth, and allows the resulting printed cloth to have high rub fastness. More specifically, the pretreatment agent, which contains a polyvalent metal compound, an anionic resin emulsion, a fluorinated water and oil proofing agent and water, maintains the whiteness of the printed cloth, and allows the pigment content and resin content in the white ink to be reduced. Consequently, the whiteness of the printed cloth can be maintained, and the white ink can be reliably ejected. In addition, the polyvalent metal compound content and the resin emulsion content can be reduced, so that pretreatment marks left on the cloth can be reduced.

Ink Jet Textile Printing Ink Set

An ink jet textile printing ink set according to an embodiment will now be described. The ink set includes the above-described pretreatment agent and an ink jet textile printing ink composition (hereinafter simply referred to as ink composition or ink). The ink composition contains 5% to 11% by mass of a white pigment, 5% to 11% by mass of a urethane resin emulsion, and water. The constituents of the ink composition will now be described in detail.

Pigment

The ink composition contains a pigment, and the pigment can be appropriately selected according to the use and type of the ink composition. The pigment may be an inorganic pigment or an organic pigment.

The ink composition is used in combination with the pretreatment agent. The ink composition may be deposited at 100 mg/inch$^2$ or more on a cloth. Such an ink composition may be a white ink used for hiding the cloth or for forming an undercoat layer on which a non-white ink will be deposited. In the following description, a white ink composition (white pigment ink) will be described by way of example.

When a white ink composition is used to hide the cloth or to form an undercoat layer on which a non-white ink will be deposited, the amount of the ejected white ink composition is set to be much larger than that of the non-white ink, and a coating (image) of the white ink is formed. By controlling the amount of the non-white ink to be deposited on a cloth to 50 mg/inch$^2$ or less, a desired image can be printed on the cloth. In contrast, in order to sufficiently hide the base material or cloth, the amount of the white ink to be deposited on the cloth is preferably 100 mg/inch$^2$ or more, more preferably 150 mg/inch$^2$ or more. The pretreatment agent of an embodiment of the invention allows the white pigment to be efficiently retained on the surface of the cloth. Accordingly, the amount of the white ink deposited on the cloth can be reduced, and a highly productive ink jet textile printing method can be provided.

White pigments that can be used in the white ink composition include, but are not limited to, inorganic white pigments, such as titanium oxide, zinc oxide, zinc sulfide, antimony oxide, and zirconium oxide. In addition to these inorganic white pigments, organic white pigments may be used, such as white hollow resin particles and polymer particles.

White pigments designated by color index (C. I.) numbers include, but are not limited to, C. I. Pigment Whites 1 (basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (titanated mica), 21 (barium sulfate), 22 (natural barium sulfate), 23 (gloss white), 24 (alumina white), 25 (gypsum), 26 (magnesium oxide-silicon oxide), 27 (silica), and 28 (anhydrous calcium silicate).

Among those, titanium oxide is preferred because it is superior in color developability and hiding power, and has a particle size suitable to be dispersed and leads to high visibility (lightness).

Preferably, titanium oxide is of rutile type, which is a typical white pigment. The rutile-type titanium oxide may be prepared in a laboratory, or obtained from commercially available products. For preparing the rutile-type titanium oxide (powder) in a laboratory, a known sulfate method or chloride method can be applied.

Commercially available products of rutile-type titanium oxide include Tipaque (registered trademark) CR-60-2, Tipaque CR-67, Tipaque R-980, Tipaque R-780, Tipaque R-850, Tipaque R-980, Tipaque R-630, Tipaque R-670, and Tipaque PF-736 (each, product of Ishihara Sangyo Kaisha, Ltd.)

The 50% average particle size (D50) of titanium oxide is preferably 50 to 500 nm, and more preferably 150 to 350 nm. Titanium oxide having such a particle size D50 can enhance the rub fastness of the printed cloth, more specifically, the rub fastness of the image of the printed cloth, and the visibility of the image, thus helping form a high-quality image.

The "50% average particle size (D50) of titanium oxide" mentioned herein refers to the D50 of titanium oxide in an ink composition, but not the D50 before preparation of the ink composition. The "50% average particle size" mentioned herein refers to a sphere-equivalent 50% average particle size measured by a dynamic light scattering method, and can be obtained by the following process.

Particles in a dispersion medium are irradiated with light, and the diffraction scattering light emitted from the particles is measured with detectors disposed in front, side and back of the dispersion medium. With the assumption that particles, which are naturally indefinite in shape, are spherical, an accumulation curve is obtained from the measurement results, wherein the total volume of the spherical particles calculated from the volumes of measured particles is 100%, and the point where the cumulative value is 50% is defined as the sphere-equivalent 50% average particle size obtained by a dynamic light scattering method.

If titanium oxide is used as the white pigment, the titanium oxide is preferably surface-treated with alumina-silica to suppress the photocatalytic function of the titanium oxide. In this instance, the amount of surface-treating agent (amount of alumina-silica) can be about 5% to 20% by mass relative to the total mass (100% by mass) of the surface-treated white pigment.

Examples of the non-white ink composition include, but are not limited to, color inks, black inks, and gray inks. Color inks include, but are not limited to, cyan inks, magenta inks, yellow inks, light cyan inks, light magenta inks, light yellow inks, red inks, green inks, and blue inks.

Non-white pigments that can be used in the non-white ink composition, that is, pigments other than white pigments, include, but are not limited to, organic pigments of azo, phthalocyanine, dye, condensed polycyclic, nitro and nitroso compounds (such as Brilliant Carmine 6B, Lake Red C, watching red, disazo yellow, Hansa Yellow, phthalocyanine blue, phthalocyanine green, alkali blue, and aniline black), metals and metal oxides or sulfides of cobalt, iron, chromium, copper, zinc, lead, titanium, vanadium, manganese and nickel, carbon blacks (C. I. Pigment Black 7) such as furnace carbon black, lampblack, acetylene black and channel black, and other inorganic pigments such as ocher, ultramarine blue and Prussian blue.

The pigment content may be 3% to 11% by mass, and can be appropriately set depending on which pigment is used. If a white pigment is used, the white pigment content is preferably 5% to 11% by mass, more preferably 5.5% to 10% by mass, relative to the total mass (100% by mass) of the ink composition from the viewpoint of preventing the settling of the pigment, enhancing the hiding power and color reproduction (particularly on black cloth), and reducing the viscosity of the ink composition. If a non-white pigment is used, the pigment content is preferably 3% to 8% by mass relative to the total mass (100% by mass) of the ink composition from the viewpoint of ensuring satisfactory color developability.

The above-described white pigments may be used singly or in combination, and the above non-white pigments may also be used singly or in combination. Also, a white pigment and a non-white pigment may be used in combination. The phrase "used in combination" implies that a non-white ink composition may contain a white pigment or a white ink composition may contain a non-white pigment, to the extent that the advantages of the invention are not lost.

Pigment Dispersion

In the ink composition, the pigment may be dispersed, that is, may be present in the form of pigment dispersion. The pigment dispersion mentioned herein may be a liquid in which the pigment is dispersed or a slurry of the pigment (low-viscosity aqueous dispersion).

The pigment dispersion contains pigment particles having a D50 of 50 nm to 1 µm. When the D50 is 50 nm or more, the resulting printed cloth exhibits a high color developability. When the D50 is 1 µm or less, the ink composition exhibits high fixity. More specifically, if a white pigment dispersion is used, it has a D50 of 100 to 600 nm, and more preferably 200 to 500 nm. When the D50 is 100 nm or more, high hiding power and color developability are exhibited. When the D50 is 1 µm or less, the ink composition exhibits high fixity and ejection reliability. If a non-white pigment dispersion is used, the non-white pigment preferably has a D50 of 70 to 230 nm, more preferably 80 to 130 nm.

The pigment in the pigment dispersion may be, but is not limited to, of self-dispersing type or polymer-dispersed type.

Resin Emulsion

The ink composition of the present embodiment preferably contains a resin emulsion, more preferably a urethane resin emulsions. By adding a urethane resin emulsion to an ink composition, the ink composition exhibit high fixity, and accordingly the resulting printed cloth has high rub fastness. In particular, the printed cloth produced using a white ink composition containing a urethane resin emulsion exhibits a higher whiteness.

The resin emulsion in the ink composition forms a resin coating on the cloth and thus allows the ink composition to be fixed to the cloth, so that the rub fastness of the printed cloth is enhanced. Accordingly, an emulsion of a urethane resin, which is thermoplastic, is used. Since urethane resin can be prepared as required, a coating having a desired physical property can be easily formed.

The urethane resin has a urethane bond in the molecule. The urethane resin may be a polyether-type urethane resin having an ether bond in the main chain, a polyester-type urethane resin having an ester bond in the main chain, or a polycarbonate-type urethane resin having a carbonate bond in the main chain.

The preferred properties of the resin emulsion will be described below. The glass transition temperature (Tg), the acid value and the 50% average particle size (D50) of the urethane resin emulsion are the same as those of the pretreatment agent described above, and thus description thereof is omitted.

The resin emulsion preferably has an elongation at break of 300% to 700% and a tensile strength (elastic modulus) of 30 to 80 MPa, from the viewpoint of preventing the image, or the coating of the ink, from fracturing or cracking on the cloth, which is an elastic recording medium, so that the resulting printed cloth can be flexible and have high rub fastness. The elongation at break and the elastic modulus are measured as described above.

Preferred examples of the urethane resin emulsion (water-dispersed polyurethane) include, but are not limited to, Sancure 2710 (product of The Lubrizol Corporation), Permarin UA-150 (product of Sanyo Chemical Industries, Ltd.), Superflex 460, Superflex 470, Superflex 610 and Superflex 700 (each, product of Dai-ichi Kogyo Seiyaku Co., Ltd.), NeoRez R-9660, NeoRez R-9637 and NeoRez R-940 (each, product of Kusumoto Chemicals, Ltd.), Adeka Bon-Tighter HUX-380 and Adeka Bon-Tighter 290K (each, product of Adeka), Takelac (registered trademark) W-605, Takelac W-635 and Takelac WS-6021 (each, product of Mitsui Chemicals, Inc.), and Polyether (Tg=20° C.) produced by Taisei Fine Chemical Co., Ltd.

Urethane resin emulsions may be used singly or in combination.

The optionally added resin emulsion other than the urethane resin emulsion may be an anionic resin emulsion from the viewpoint of preventing the aggregation of the resin. The anionic resin emulsion is the same as in the description of the pretreatment agent, and thus description thereof is omitted.

Preferably, the urethane resin emulsion content in terms of slid content is 5% to 11% by mass, more preferably 5.5% to 10% by mass, relative to the total mass (100% by mass) of the ink composition. When the urethane resin emulsion content in terms of solid content is 5% by mass or more, the rub fastness of the printed cloth is satisfactory. Also, if the ink composition is a white ink composition, the whiteness of the printed cloth is increased. When the urethane resin emulsion content in terms of solid content is 11% by mass or less, the viscosity of the ink can be low.

The total resin emulsion content, including the urethane resin emulsion, is preferably 5% to 15% by mass in terms of solid content relative to the total mass (100% by mass) of the ink composition. When the total resin emulsion content is in such a range, the resin (polymer) content in terms of solid content in the ink composition can be reduced. Consequently, the ink composition can be reliably ejected.

Water

The ink composition of the present embodiment is aqueous and contains water as an aqueous solvent. Other aqueous solvents such as water-soluble organic solvent may be contained. The water may be, but is not limited to, pure water or ultrapure water, such as ion exchanged water, ultrafiltered water, reverse osmotic water, or distilled water. The water content can be appropriately set without particular limitation. From the viewpoint of appropriately controlling the viscosity of the ink composition, the water content can be 20% to 80% by mass relative to the total mass (100% by mass) of the ink composition.

Penetrant

The ink composition may further contain a penetrant so that the aqueous solvent can more sufficiently penetrate the cloth. By allowing the aqueous solvent to penetrate the cloth rapidly, bleeding in the image can be reduced in the resulting printed cloth.

Examples of the penetrant include alkyl ethers of polyhydric alcohols (glycol ethers) and 1,2-alkyldiols. Examples of glycol ether include, but are not limited to, ethylene glycol monomethyl ether, ethylene glycol monoethyl ether, ethylene glycol monopropyl ether, ethylene glycol monobutyl ether, ethylene glycol monomethyl ether acetate, diethylene glycol monomethyl ether, diethylene glycol monoethyl ether, diethylene glycol monopropyl ether, diethylene glycol monobutyl ether, diethylene glycol mono-t-butyl ether, triethylene glycol monobutyl ether, 1-methyl-1-methoxybutanol, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, propylene glycol monobutyl ether, and dipropylene glycol monobutyl ether. Examples of 1,2-alkyldiols include 1,2-pentanediol and 1,2-hexanediol. In addition, linear hydrocarbon diols may be used, such as 1,3-propanediol, 1,4-butanediol, 1,5-pentanediol, 1,6-hexanediol, 1,7-heptanediol, and 1,8-octanediol.

Penetrants may be used singly or in combination.

The penetrant content is preferably 0.1% to 20% by mass, more preferably 0.5% to 10% by mass, relative to the total mass (100% by mass) of the ink composition. When the penetrant content is 0.1% by mass or more, the penetration of the ink composition into the cloth can be facilitated. When the penetrant content is 20% by mass or less, the ink composition does not cause bleeding in the image, and the viscosity of the ink composition does not increase.

Moisturizing Agent

The ink composition of the present embodiment may further contain a moisturizing agent. Any moisturizing agent generally used in ink jet ink can be used without particular limitation. A moisturizing agent having a high boiling point of 180° C. or more, preferably 200° C. or more, is advantageous. An ink composition containing a moisturizing agent having such a high boiling point can exhibit good water retention ability and can impart good water retention and wettability.

Exemplary moisturizing agents having a high boiling point include, but are not limited to, 2-pyrrolidone, N-methyl-2-pyrrolidone, N-ethyl-2-pyrrolidone, ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycols having a number average molecular weight of 2000 or less, 1,3-propylene glycol, isopropylene glycol, isobutylene glycol, glycerin, meso-erythritol, and pentaerythritol.

Moisturizing agents may be used singly or in combination. By adding a moisturizing agent having a high boiling point to the ink composition, the fluidity and redispersibility of the ink can be maintained for a long time even if the ink is allowed to stand in contact with air at room temperature. In addition, such an ink composition does not easily clog nozzles during textile printing using an ink jet textile printing apparatus or at the time restarting the printing. Accordingly, the ink composition can be reliably ejected through the nozzles. The moisturizing agent content can be appropriately set as required without particular limitation.

Other Constituents

In order to maintain good storage stability and good ejection reliability of the ink composition, and also in order to prevent the degradation of the ink composition, the ink composition may optionally contain other additives, such as a surfactant, a solubilizing agent, a viscosity modifier, a pH adjuster, an antioxidant, a preservative, an antifungal agent, a corrosion inhibitor, and a chelating agent for capturing metal ions affecting the dispersion of the pigment. The surfactant is the same as in the description of the pretreatment agent, and thus description thereof is omitted.

Thus, the ink composition of the ink jet textile printing ink set of the present embodiment is superior particularly in ejection reliability. The ink jet textile printing ink set of the present embodiment can produce a printed cloth having good texture and feeling. In addition, the printed cloth exhibits high whiteness. More specifically, satisfactorily white image can be formed in the printed cloth.

Ink Jet Textile Printing Method

An ink jet textile printing method according to an embodiment of the invention will be described below. In the ink jet textile printing method of the present embodiment, an image is formed on a cloth by ink jet textile printing using the above-described ink jet textile printing ink set.

More specifically, in the ink jet textile printing method, a cloth is pretreated by applying the above-described pretreatment agent for ink jet textile printing, and then an image is formed by depositing the ink composition of the ink jet textile printing ink set on the pretreated cloth. Preferably, in the step of forming the image, after the ink composition is deposited on the cloth, the cloth is heated.

The cloth used for ink jet textile printing may be, but is not limited to, natural or synthetic textile, such as that of silk, cotton, sheep wool, nylon, polyester, or rayon. For example, cotton cloth may be used because it is resistant to high-temperature fixation of the ink composition.

In the ink jet textile printing method, the ink composition is placed in an ink jet textile printing apparatus before use. The ink jet textile printing apparatus may be, but is not limited to, of drop-on-demand type. The drop-on-demand ink jet textile printing apparatus may adopt an ink jet textile printing technique using piezoelectric elements disposed in a head, an ink jet textile printing technique using heaters of heat resistors disposed in a head, or other techniques, and any recording technique may be used.

Pretreatment

In order to prevent the ink from bleeding on the surface of the cloth, the cloth is pretreated with the above-described pretreatment agent before forming an image by depositing the ink composition onto the cloth. The pretreatment is performed by applying the pretreatment agent to the cloth, and preferably, the cloth is dried after the pretreatment agent has been applied.

More specifically, the pretreatment may be performed by, but is not limited to, immersing the cloth in the pretreatment agent, putting a coat of the pretreatment agent on the cloth, or spraying the pretreatment agent onto the cloth.

The drying after applying the pretreatment agent to the cloth is performed by heating within 2 minutes at a temperature of preferably 110 to 200° C., more preferably 120 to 180° C. By setting the heating temperature to 110° C. or more, the pretreatment agent can be satisfactorily fixed. Also, when the heating temperature is 200° C. or less, the degradation of the cloth and the polymer and other constituents of the pretreatment agent can be prevented effectively.

Image Formation

In the step of image formation, first, an image is formed by ejecting an ink composition onto the pretreated cloth. The ejection conditions can be appropriately set according to the physical property of the ink composition.

Then, the cloth on which the ink composition has been applied is subjected to heat treatment. By this heat treatment, the resin (polymer) of the urethane resin emulsion and the like in the ink composition is fused on the surface of the cloth, and water is evaporated. Consequently, the rub fastness of the resulting printed cloth can be further enhanced.

The heating in the step of image formation may be performed by, but is not limited to, heat press, normal-pressure steaming, high-pressure steaming, or thermal fixing. The heat source for the heating may be, but is not limited to, infrared rays (lamp). The heating temperature can be a level at which the resin (polymer) of the urethane resin emulsion and the like in the ink composition can be fused, and at which moisture can be evaporated. Thus, it is, for example, about 150 to 200° C.

After the heating, the printed cloth may be washed and dried. At this time, soaping treatment, that is, washing out the unfixed pigment with a heat soap solution, may be performed, if necessary.

Thus, a printed cloth, which has an image formed on a cloth or the like using the above-described ink set, is completed. In the method of the present embodiment, the ink composition can be reliably ejected, and pretreatment marks are hardly formed. In addition, the resulting printed cloth exhibits high rub fastness because of the high fixity (adhesion) of the ink composition, and exhibits superior whiteness.

EXAMPLES

The above-described embodiments of the invention will now be further described in detail with reference to Examples. However, the invention is not limited to the Examples.

Materials Used for Preparation of Pretreatment Agent

The following materials were mainly used for the pretreatment agents of the Examples and Comparative Examples.

1. Polyvalent Metal Compound

Calcium nitrate tetrahydrate (calcium content: 17.0% by mass)

Calcium chloride dihydrate (calcium content: 27.20% by mass)

2. Anionic Resin Emulsion

Mowinyl 966A (product of Nippon Synthetic Chemical Industry, styrene/acrylic resin emulsion, solid content: 45% by mass, hereinafter referred to as anionic resin A)

Mowinyl 7320 (product of Nippon Synthetic Chemical Industry, acrylic resin emulsion, solid content: 40% by mass, hereinafter referred to as anionic resin B)

3. Fluorinated Water and Oil Repellent

Asahi Guard AG-E400 (product of Asahi Glass, weakly cationic fluororesin emulsion, solid content: 20% by mass, hereinafter referred to as fluorinated water and oil repellent)

4. Surfactant

BYK-348 (product of BYK, described above)

Preparation of Pretreatment Agent

The materials shown in Tables 1 and 2 were mixed in the proportions (percent by mass) shown in the Tables, and the mixture was sufficiently stirred to prepare pretreatment agent P1 to P15 (total: 100% by mass). In Tables 1 and 2, the "calcium content" refers to the content (percent by mass) of the calcium compound in terms of calcium. The "anionic resin content" refers to the anionic resin emulsion content (percent by mass) in terms of solid content in the pretreatment agent. The "fluororesin content" refers to the fluorinated water and oil repellent content (percent by mass) in terms of solid content in the pretreatment agent.

Materials Used for Preparation of Ink Composition

The following materials were mainly used in the ink compositions of the Examples and Comparative Examples.

1. Pigment

Titanium oxide slurry (NanoTek® Slurry, produced by C.I. Kasei, titanium oxide solid content: 20% by mass, average particle size: 250 nm)

2. Urethane Resin Emulsion

Superflex 460 (product of Dai-ichi Kogyo Seiyaku, anionic, solid content: 38% by mass, tensile strength: 25 MPa, elongation: 750%, hereinafter referred to as urethane resin A)

TABLE 1

Pretreatment Agents P1 to P8

| Material | P1 | P2 | P3 | P4 | P5 | P6 | P7 | P8 |
|---|---|---|---|---|---|---|---|---|
| Calcium nitrate tetrahydrate | 20 | 7 | 29 | 20 | 20 | 20 | 20 | — |
| Calcium chloride dihydrate | — | — | — | — | — | — | — | — |
| Anionic resin A (solid content: 45 mass %) | 8 | 8 | 8 | 3 | 10.5 | 8 | 8 | 8 |
| Anionic resin B (Solid content: 40 mass %) | — | — | — | — | — | — | — | — |
| Fluorinated water and oil repellent (Solid content: 20 mass %) | 5 | 5 | 5 | 5 | 5 | 1.2 | 10 | 5 |
| BYK-348 | 0.1 | 0.1 | 0.1 | 0.1 | 0.1 | 0.1 | 0.1 | 0.1 |
| Ion exchanged water | Balance | Balance | Balance | Balance | Balance | Balance | Balance | Balance |
| Calcium content | 3.4 | 1.2 | 4.9 | 3.4 | 3.4 | 3.4 | 3.4 | 3.3 |
| Anionic resin content | 3.6 | 3.6 | 3.6 | 1.4 | 4.7 | 3.6 | 3.6 | 3.6 |
| fluororesin content | 1.0 | 1.0 | 1.0 | 1.0 | 1.0 | 0.2 | 2.0 | 1.0 |

TABLE 2

Pretreatment Agents P9 to P15

| Material | P9 | P10 | P11 | P12 | P13 | P14 | P15 |
|---|---|---|---|---|---|---|---|
| Calcium nitrate tetrahydrate | 33 | 20 | 20 | 20 | — | 20 | 20 |
| Calcium chloride dihydrate | — | — | — | — | — | — | — |
| Anionic resin A (solid content: 45 mass %) | 8 | 12 | 8 | — | 8 | — | 8 |
| Anionic resin B (Solid content: 40 mass %) | — | — | — | 9 | — | — | — |
| Fluorinated water and oil repellent (Solid content: 20 mass %) | 5 | 5 | 12 | 5 | 5 | 5 | — |
| BYK-348 | 0.1 | 0.1 | 0.1 | 0.1 | 0.1 | 0.1 | 0.1 |
| Ion exchanged water | Balance | Balance | Balance | Balance | Balance | Balance | Balance |
| Calcium content | 5.6 | 3.4 | 3.4 | 3.2 | 0.0 | 3.4 | 3.4 |
| Anionic resin content | 3.6 | 5.4 | 3.6 | 3.6 | 3.5 | 0.0 | 3.5 |
| fluororesin content | 1.0 | 1.0 | 2.4 | 1.0 | 1.0 | 1.0 | 0.0 |

Takelac WS-6021 (product of Mitsui Chemicals, anionic, solid content: 30% by mass, tensile strength: 50 MPa, elongation: 750%, hereinafter referred to as urethane resin B)

3. Moisturizing Agent

Glycerol (produced by Sakamoto Yakuhin Kogyo Co., Ltd.)

Triethylene glycol (produce by Kanto Chemical, hereinafter referred to as TEG)

4. Penetrant

Triethylene glycol monobutyl ether (produced by Kanto Chemical, hereinafter referred to as TEGmBE)

1,2-Hexanediol (produced by Kanto Chemical, hereinafter referred to as 1,2-HD)

5. Surfactant

BYK-348 (product of BYK, described above)

Preparation of Ink Compositions

The materials shown in Table 3 were mixed in the proportions (percent by mass) shown in the Table, and the mixture was sufficiently stirred. The mixture was filtered through a metal filter of 5 µm in pore size and was then deaerated with a vacuum pump. Thus, ink compositions W1 to W5 were prepared (total: 100% by mass). These ink compositions were used in the Examples and Comparative Examples. In Table 3, the "titanium oxide content" refers to the titanium oxide slurry content (percent by mass) in terms of titanium oxide in the ink composition. Also, the "urethane resin content" refers to the urethane resin emulsion content (percent by mass) in terms of solid content in the ink composition.

TABLE 3

Ink compositions W1 to W5

| Material | Ink No. | | | | |
|---|---|---|---|---|---|
| | W1 | W2 | W3 | W4 | W5 |
| Titanium oxide slurry (Solid content: 20 mass %) | 55 | 55 | 55 | 55 | 80 |
| Urethane resin A (Solid content: 20 mass %) | 22 | 22 | — | 35 | 14 |
| Urethane resin B (Solid content: 38 mass %) | — | — | 25 | — | — |
| Glycerol | 10 | 10 | 10 | 5 | 2 |
| TEG | 1 | 1 | 1 | 1 | 1 |
| TEGmBE | 1 | — | 1 | 1 | 1 |
| 1,2-HD | — | 1 | — | — | — |
| BYK-348 | 0.3 | 0.3 | 0.3 | 0.3 | 0.3 |
| Ion exchanged water | Balance | Balance | Balance | Balance | Balance |
| Titanium oxide content | 8.25 | 8.25 | 8.25 | 8.25 | 12 |
| Urethane resin content | 8.36 | 8.36 | 7.5 | 13.3 | 5.32 |

Preparation of Printed Cloth

Pretreatment

Each of the pretreatment agent was applied to a 100%-cotton T shirt (heavy weight black cloth produced by HANES) with a roller. The amount of the pretreatment agent applied was 18 to 20 g for an area corresponding to an A4 paper sheet. The pretreated shirt was heat-treated at 160° C. for one minute with a heat pressing machine.

Ink Deposition

Each of the ink compositions prepared above was deposited onto the pretreated cloth or T-shirt using an ink jet printer PX-G930 (manufactured by Seiko Epson Corporation). The combinations of the pretreatment agent and the ink composition in the Examples and Comparative Examples were shown in Tables 4 and 5. More specifically, in each combination, a solid image of four coats was formed by depositing 180 mg/inch$^2$ of white ink on the cloth at a recording resolution of 1440 dpi by 1440 dpi. Thus, ink jet textile printing was performed. A solid image mentioned herein refers to an image defined only by pixels in which dots are formed. The pixel refers to a minimum recording unit area defining a recording resolution.

Heat Treatment

The cloth on which the ink had been deposited was heat-treated to fix the ink at 160° C. for one minute using a heat pressing machine. Thus, a printed cloth on which a white image was formed (white ink was printed) was produced.

Evaluation

The ejection reliability of each ink was evaluated. The degree of pretreatment marks was also be evaluated for each pretreatment agent. Furthermore, the whiteness and rub fastness of each of the resulting printed cloths were evaluated.

1. Whiteness of Printed Cloth

The L* value in the CIE/L*a*b* color system of the printed cloth was measured with a commercially available colorimeter Gretag Macbeth Spectrolino (manufactured by X-Rite). The evaluation criteria were as follows, and the results are shown in Tables 4 and 5:

Excellent: L*≥94
Good: 94>L*≥92
Fair: 92>L*≥90
Bad: 90>L*

2. Rub Fastness of Printed Cloth

Rubbing tests were performed using a Gakushin-type rubbing tester (manufacture by Tester Sangyo Co., Ltd.) For the test, the printed image was rubbed 100 times with a dried black plain weave cotton cloth at a load of 500 g, and then, the degree of dart on the cotton cloth and the surface state of the printed image were visually observed. The evaluation criteria were as follows, and the results are shown in Tables 4 and 5:

Good: The cotton cloth was hardly colored. One linear rubbing mark or less was observed in the white printed image.

Fair: The cotton cloth was slightly colored. Two to five linear rubbing marks were observed in the white printed image.

Bad: The cotton cloth was distinctly colored. At least six linear rubbing marks or at least one planar rubbing mark was observed in the white printed image.

3. Pretreatment Marks

The degree of pretreatment marks formed by the pretreatment was evaluated by comparing the cloth before and after the pretreatment (heat treatment). More specifically, the color difference ΔE in the CIE/L*a*b* colorimetric system between before and after the pretreatment was measured with a commercially available colorimeter Gretag Macbeth Spectrolino (manufactured by X-Rite). In addition, the degree of pretreatment marks was visually observed. The evaluation criteria were as follows, and the results are shown in Tables 4 and 5:

Excellent: ΔE<1; Visual difference between before and after the pretreatment was very small.

Good: 2>ΔE≥1; Visual difference between before and after the pretreatment was small.

Fair: 3>ΔE≥2; Visual difference between before and after the pretreatment was small.

Bad: ΔE≥3; Visual difference between before and after the pretreatment was large.

4. Ink Ejection Reliability

Evaluation was performed with an ink jet printer PX-G930 (manufactured by Seiko Epson). Each of the ink compositions prepared above was placed in the head of the printer and it was ensured that the ink composition was ejected through all the nozzles of the head. Then, the head was allowed to stand at 40° C. for one week at a position other than the home position, that is, at a position away from the cap of the printer, without being covered with the cap. After that, cleaning was repeated until the ink composition was appropriately ejected again. The number of times of cleaning was counted for evaluation. The evaluation criteria were as follows, and the results are shown in Tables 4 and 5:

Goof: Recovered by cleaning one to five times.
Fair: Recovered by cleaning six to ten times.
Bad: Recovered by cleaning 11 times or more.

TABLE 4

Examples 1 to 12

| Item | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pretreatment No. | P1 | P2 | P3 | P4 | P5 | P6 | P7 | P8 | P9 | P10 | P11 | P1 |
| Ink No. | W1 | W1 | W1 | W1 | W1 | W1 | W1 | W1 | W1 | W1 | W1 | W2 |
| Whiteness | Excellent | Good | Excellent | Good | Excellent | Good | Excellent | Excellent | Excellent | Excellent | Excellent | Excellent |
| Rub fastness | Good | Good | Good | Good | Good | Good | Good | Good | Fair | Good | Fair | Good |
| Pretreatment mark | Good | Excellent | Good | Excellent | Good | Good | Good | Good | Fair | Fair | Good | Good |
| Ejection reliability | Good | Good | Good | Good | Good | Good | Good | Good | Good | Good | Good | Fair |

TABLE 5

Examples 13 and 14, Comparative Examples 1 to 9

| Item | Example | | Comparative Example | | | | | | | | |
|---|---|---|---|---|---|---|---|---|---|---|---|
| | 13 | 14 | 1 | 2 | 3 | 4 | 5 | 6 | 7 | 8 | 9 |
| Pretreatment No. | P1 | P12 | P13 | P13 | P13 | P14 | P14 | P14 | P15 | P15 | P15 |
| Ink No. | W3 | W1 | W1 | W4 | W5 | W1 | W4 | W5 | W1 | W4 | W5 |
| Whiteness | Excellent | Excellent | Bad | Bad | Bad | Bad | Fair | Fair | Bad | Fair | Fair |
| Rub fastness | Good | Good | Good | Good | Fair | Fair | Good | Fair | Good | Good | Fair |
| Pretreatment mark | Good | Good | Good | Good | Good | Good | Good | Good | Good | Good | Good |
| Ejection reliability | Fair | Good | Good | Bad | Bad | Good | Bad | Bad | Good | Bad | Bad |

The above results show that each ink jet textile printing ink set of the Examples, which includes a pretreatment agent containing a polyvalent metal compound, an anionic resin emulsion, a fluorinated water and oil repellent and water, allows the ink composition to be reliably ejected, and produces highly white printed cloth without forming pretreatment marks, and that the resulting printed cloth has a high rub fastness.

The above results lead to the following consideration. If an anionic resin emulsion and a cationic fluorinated water and oil repellent are mixed, aggregation often occurs. Therefore, they are not used together in the pretreatment agent. However, a weakly cationic specific fluorinated water and oil repellent was used in the above Examples. It is believed that the use of such a weakly cationic fluorinated water and oil repellent resulted in good results. The consideration does not limit the scope of the invention.

What is claimed is:

1. A pretreatment agent for ink jet textile printing on a cloth using an aqueous white ink composition which comprises white pigment, a urethane resin emulsion, and water, the pretreatment agent comprising:

a polyvalent metal compound;
an anionic resin emulsion;
a fluorinated water and oil repellent; and
water, wherein said polyvalent metal compound aggregates said white pigment on the surface of said cloth,
said anionic resin emulsion prevents color unevenness,
said fluorinated water and oil repellent reduces at least either the pigment concentration in said white ink composition or the resin concentration in said white ink composition.

2. The pretreatment agent according to claim 1, wherein the polyvalent metal compound is at least one of calcium nitrate and calcium chloride.

3. The pretreatment agent according to claim 1, wherein the content of the metal component of the polyvalent metal compound is 1% to 5% by mass relative to the total mass of the pretreatment agent.

4. The pretreatment agent according to claim 1, wherein the anionic resin emulsion content in terms of solid content is 1% to 5% by mass relative to the total mass of the pretreatment agent, and the fluorinated water and oil repellent content in terms of solid content is 0.2% to 2% by mass relative to the total mass of the pretreatment agent.

5. An ink jet textile printing ink set for ink jet textile printing on a cloth comprising:

the pretreatment agent as set forth in claim 1; and
an ink jet textile printing aqueous white ink composition containing 3% to 11% by mass of a white pigment, 5% to 11% by mass of a urethane resin emulsion, and water.

6. An ink jet textile printing ink set for ink jet textile printing on a cloth comprising:
   the pretreatment agent as set forth in claim 2; and
   an ink jet textile printing ink composition containing 3% to 11% by mass of a pigment, 5% to 11% by mass of a urethane resin emulsion, and water.

7. An ink jet textile printing ink set for ink jet textile printing on a cloth comprising:
   the pretreatment agent as set forth in claim 3; and
   an ink jet textile printing ink composition containing 3% to 11% by mass of a pigment, 5% to 11% by mass of a urethane resin emulsion, and water.

8. An ink jet textile printing ink set for ink jet textile printing on a cloth comprising:
   the pretreatment agent as set forth in claim 4; and
   an ink jet textile printing ink composition containing 3% to 11% by mass of a pigment, 5% to 11% by mass of a urethane resin emulsion, and water.

9. The ink jet textile printing ink set according to claim 5, wherein the white pigment content in the ink jet textile printing ink composition is 5% to 11% by mass.

10. An ink jet textile printing method using the ink jet textile printing ink set as set forth in claim 5, the method comprising:
    pretreating a cloth by applying the pretreatment agent to the cloth; and
    forming an image by depositing the ink jet textile printing aqueous white ink composition on the pretreated cloth.

11. An ink jet textile printing method using the ink jet textile printing ink set as set forth in claim 6, the method comprising:
    pretreating a cloth by applying the pretreatment agent to the cloth; and
    forming an image by depositing the ink jet textile printing aqueous white ink composition on the pretreated cloth.

12. An ink jet textile printing method using the ink jet textile printing ink set as set forth in claim 7, the method comprising:
    pretreating a cloth by applying the pretreatment agent to the cloth; and
    forming an image by depositing the ink jet textile printing aqueous white ink composition on the pretreated cloth.

13. An ink jet textile printing method using the ink jet textile printing ink set as set forth in claim 8, the method comprising:
    pretreating a cloth by applying the pretreatment agent to the cloth; and
    forming an image by depositing the ink jet textile printing aqueous white ink composition on the pretreated cloth.

14. An ink jet textile printing method using the ink jet textile printing ink set as set forth in claim 9, the method comprising:
    pretreating a cloth by applying the pretreatment agent to the cloth; and
    forming an image by depositing the ink jet textile printing aqueous white ink composition on the pretreated cloth.

* * * * *